(12) United States Patent
Eren et al.

(10) Patent No.: US 10,992,690 B1
(45) Date of Patent: *Apr. 27, 2021

(54) NETWORK TRAFFIC INSPECTION

(71) Applicant: Fyde, Inc., Palo Alto, CA (US)

(72) Inventors: Sinan Eren, Woodside, CA (US); Jose Luis Ferras Pereira, San Mateo, CA (US); Pablo German Sole, Woodside, CA (US); Luisa Marina Moya Praca de Araujo Lima, Oporto (PT)

(73) Assignee: Fyde, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/508,970

(22) Filed: Jul. 11, 2019

Related U.S. Application Data

(63) Continuation of application No. 16/189,964, filed on Nov. 13, 2018, now Pat. No. 10,404,726, which is a
(Continued)

(51) Int. Cl.
| | |
|---|---|
| *H04L 29/06* | (2006.01) |
| *G06F 21/55* | (2013.01) |
| *G06F 21/56* | (2013.01) |
| *G06F 21/57* | (2013.01) |
| *H04W 12/12* | (2021.01) |

(52) U.S. Cl.
CPC ...... *H04L 63/1416* (2013.01); *H04L 63/0236* (2013.01); *H04L 63/0272* (2013.01); *H04W 12/12* (2013.01); *G06F 21/55* (2013.01); *G06F 21/552* (2013.01); *G06F 21/554* (2013.01); *G06F 21/56* (2013.01); *G06F 21/566* (2013.01); *G06F 21/57* (2013.01); *H04L 63/14* (2013.01); *H04L 63/1433* (2013.01); *H04L 63/1466* (2013.01); *H04L 63/1483* (2013.01)

(58) Field of Classification Search
CPC ..... H04L 29/06; H04L 63/14; H04L 63/1416; H04L 63/1433; H04L 63/1466; H04L 63/1483; H04L 63/0236; H04L 63/0272; G06F 21/55; G06F 21/552; G06F 21/554; G06F 21/56; G06F 21/566; G06F 21/57; H04W 12/12
See application file for complete search history.

(56) References Cited

U.S. PATENT DOCUMENTS

| | | | |
|---|---|---|---|
| 8,095,786 B1 * | 1/2012 | Kshirsagar | H04L 63/0272 713/152 |
| 2002/0049913 A1 * | 4/2002 | Lumme | H04W 12/001 726/13 |

(Continued)

OTHER PUBLICATIONS

Abdullah Alshalan, Sandeep Pisharody, and Dijiang Huang. "A survey of mobile VPN technologies." IEEE Communications Surveys & Tutorials 18, No. 2 (2016): 1177-1196.
(Continued)

*Primary Examiner* — Jayesh M Jhaveri
(74) *Attorney, Agent, or Firm* — Van Pelt, Yi & James LLP

(57) ABSTRACT

Techniques for inspecting network traffic are disclosed. An application executing as an operating system extension that uses a virtual private network (VPN) stack of the operating system intercepts an Internet protocol (IP) packet for delivery to a remote computer system. A determination is made of an action to take in response to intercepting the packet. The determined action is taken.

40 Claims, 13 Drawing Sheets

Related U.S. Application Data continuation of application No. 15/727,488, filed on Oct. 6, 2017, now Pat. No. 10,574,676.

(56) References Cited

U.S. PATENT DOCUMENTS

| | | | |
|---|---|---|---|
| 2002/0161904 | A1 | 10/2002 | Tredoux |
| 2006/0015722 | A1* | 1/2006 | Rowan .................. H04L 9/3268 713/166 |
| 2006/0029062 | A1* | 2/2006 | Rao ....................... H04L 63/164 370/389 |
| 2006/0031407 | A1 | 2/2006 | Dispensa |
| 2007/0199060 | A1 | 8/2007 | Touboul |
| 2008/0127311 | A1 | 5/2008 | Yasaki |
| 2008/0146211 | A1 | 6/2008 | Mikan |
| 2008/0313728 | A1 | 12/2008 | Pandrangi |
| 2010/0154055 | A1 | 6/2010 | Hansen |
| 2010/0250920 | A1* | 9/2010 | Chandrika .......... H04L 12/4633 713/152 |
| 2011/0231900 | A1 | 9/2011 | Shimoe |
| 2012/0240185 | A1* | 9/2012 | Kapoor ............... H04L 41/0866 726/1 |
| 2012/0311697 | A1 | 12/2012 | Swingler |
| 2013/0159021 | A1 | 6/2013 | Felsher |
| 2013/0198065 | A1 | 8/2013 | McPherson |
| 2013/0227636 | A1* | 8/2013 | Bettini .................. G06F 21/568 726/1 |
| 2015/0170144 | A1 | 6/2015 | Palma Lizana |
| 2015/0281258 | A1* | 10/2015 | Watkins ............. G06Q 30/0277 726/23 |
| 2016/0088022 | A1 | 3/2016 | Handa |
| 2016/0241665 | A1 | 8/2016 | Covell |
| 2016/0255505 | A1 | 9/2016 | Oberheide |
| 2017/0171242 | A1 | 6/2017 | Akcin |
| 2017/0310703 | A1 | 10/2017 | Ackerman |
| 2017/0331858 | A1 | 11/2017 | Clark, III |
| 2018/0115551 | A1 | 4/2018 | Cole |
| 2018/0137296 | A1 | 5/2018 | Cahana |
| 2018/0191680 | A1 | 7/2018 | Ahuja |
| 2019/0109864 | A1 | 4/2019 | Eren |

OTHER PUBLICATIONS

Anh Le, Janus Varmarken, Simon Langhoff, Anastasia Shuba, Minas Gjoka, and Athina Markopoulou. "AntMonitor: A system for monitoring from mobile devices." in Proceedings of the 2015 ACM SIGCOMM Workshop on Crowdsourcing and Crowdsharing of Big (Internet) Data, pp. 15-20. ACM, 2015.

Amble et al., Ordered Hash Tables, the Computer Journal, Jun. 1973, pp. 135-142, vol. 17, No. 2.

Author Unknown, A Better Compressed Bitset, Roaring Bitmaps, 2017.
Author Unknown, Creating SCIM Connectors, Okta, Jun. 22, 2018.
Author Unknown, C-SPIFFE, GitHub, Dec. 7, 2018.
Author Unknown, Design Document: SPIFFE Reference Implementation (SRI), Aug. 2, 2017.
Author Unknown, Ghostunnel, GitHub, Sep. 27, 2017.
Author Unknown, Go SPIFFE, GitHub, Nov. 27, 2019.
Author Unknown, NSURLIsExcludedFromBackupKey, Apple Developer Documentation, 2019.
Author Unknown, SCIM: Provisioning with Okta Lifecycle Management, Okta Developer, 2019.
Author Unknown, Secure Enclave Crypto, GitHub, Dec. 21, 2016.
Author Unknown, Security, Vanadium, 2019.
Author Unknown, SPIFFE-Helper, GitHub, Oct. 8, 2019.
Author Unknown, SPIFFE-Nginx, GitHub, Oct. 9, 2018.
Author Unknown, Spire, GitHub, Jan. 22, 2020.
Author Unknown, Storing Keys in the Secure Enclave, Apple Developer Documentation, 2019.
Author Unknown, The X.509 SPIFFE Verifiable Identity Document, Github, Sep. 4, 2019.
Barnes et al., Automatic Certificate Management Environment (ACME), Jun. 21, 2017.
Brown et al., Transport Layer Security (TLS) Authorization Extensions, May 2010.
Cahill et al., Assertions and Protocols for the OASIS Security Assertion Markup Language (SAML) V2.0, OASIS Standard, Mar. 15, 2005.
Carpenter et al., A Reference Model for Autonomic Networking, Feb. 23, 2018.
Cittadini et al., BeyondCorp Part III: The Access Proxy, ;login:, 2016, pp. 28-33, vol. 41, No. 4.
Farrell et al., An Internet Attribute Certificate Profile for Authorization, Jan. 2010.
Ghali et al., Application Layer Transport Security, Google Cloud, Dec. 2017.
Ian Haken, Secrets at Scale Automated Bootstrapping of Secrets and Identity in the Cloud, Enigma, Jan. 30, 2017.
Josang et al., Trust Transitivity and Conditional Belief Reasoning, IFIPTM, 2012, pp. 68-83.
Matt Klein, Service Mesh Data Plane vs. Control Plane, Envoy Proxy, Oct. 10, 2017.
Nir et al., Considerations for Using Short Term Certificates, Mar. 5, 2018.
Prabath Siriwardena, Short-Lived Certificates @ Netflix, Medium, May 10, 2016.
Richters et al., Trust Transitivity in Social Networks, PLoS One, Apr. 5, 2011.
Thompson et al., Certificate-Based Authorization Policy in a PKI Environment, 2001.
Topalovic et al., Towards Short-Lived Certificates, 2012.

* cited by examiner

FIG. 7B

Dear Apple Customer,

An iPhone registered to your account has been located. Sign in with your Apple ID to view it's current location:

https://îcloud.com/FindMyiPhone/

Apple Support
https://support.apple.com/.

*FIG. 7E*

NETWORK TRAFFIC INSPECTION

CROSS REFERENCE TO OTHER APPLICATIONS

This application is a continuation of co-pending U.S. patent application Ser. No. 16/189,964, entitled NETWORK TRAFFIC INSPECTION filed Nov. 13, 2018, which is a continuation of co-pending U.S. patent application Ser. No. 15/727,488 entitled NETWORK TRAFFIC INSPECTION filed Oct. 6, 2017, both of which are incorporated herein by reference for all purposes.

BACKGROUND

Network traffic inspection has been a long-term technical challenge, with increased difficulty as technology evolves and more devices with heterogeneous operating systems are added to the system. Applications of network traffic inspection range from network traffic measurements and bandwidth control to monitoring and security applications, such as intrusion or threat prevention detection.

In an example, a user receives an email or a text as part of a phishing attack. The email or text includes a link to a phishing website that is designed as a clone of a well-known website. When the user clicks on the link, the phishing website is displayed on his computer, and the user is tricked into believing that the phishing website is the well-known website. The user is prompted to enter his login ID and his password, and he enters this sensitive information, which is then captured by the phishing website. The criminals that operate the phishing website are able to exploit this sensitive information by using it to log in to the well-known website.

One application of network traffic inspection is related to security. If the network traffic of the user's access of the phishing website could be inspected by a security application, the security application could detect that the user is accessing a suspicious website, and could flag the access as a potential security threat.

BRIEF DESCRIPTION OF THE DRAWINGS

Figure 7B:
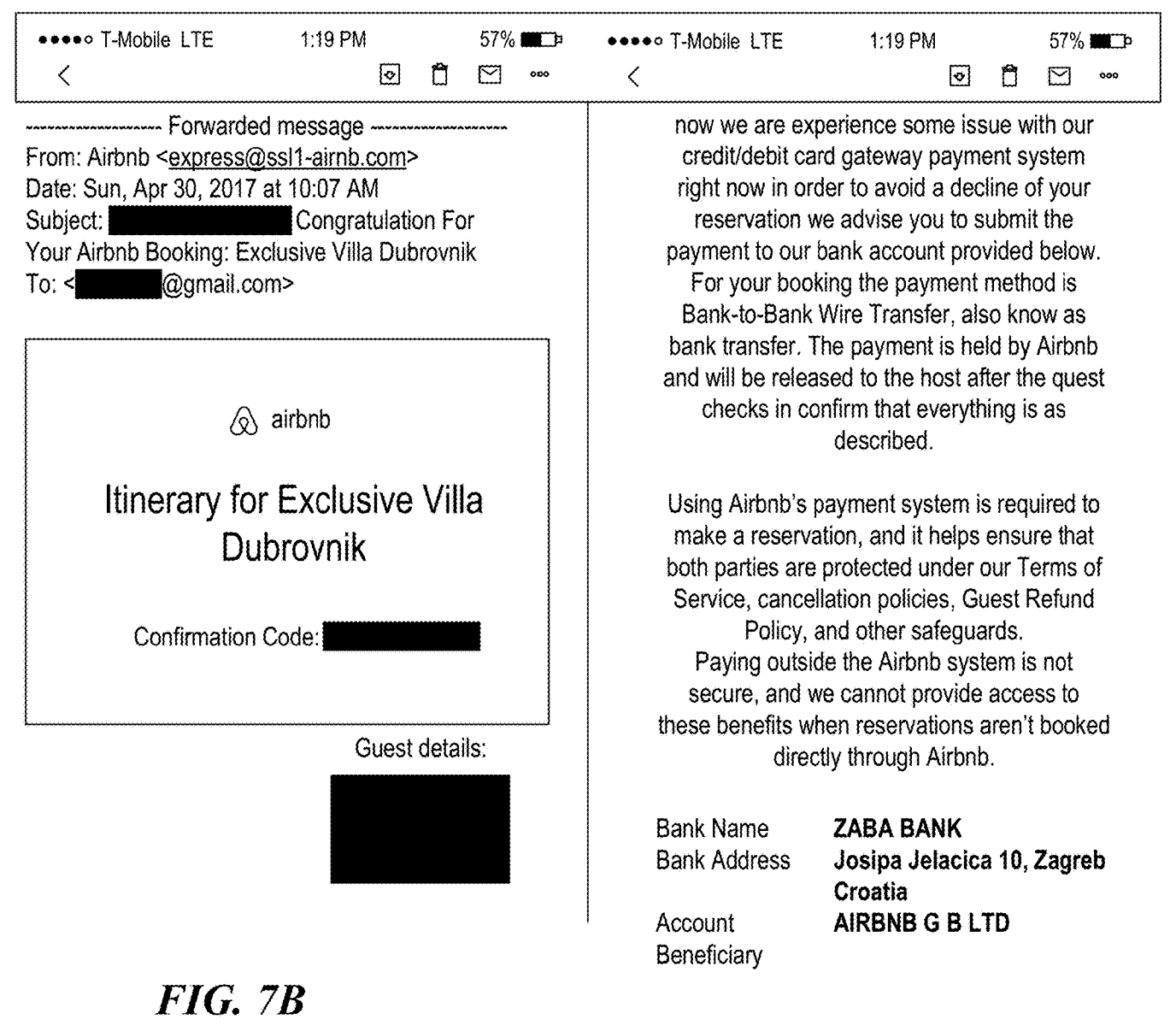

FIGS. 7A-E are illustrations of various security threats, consistent with various embodiments.

DETAILED DESCRIPTION

Figure 1:
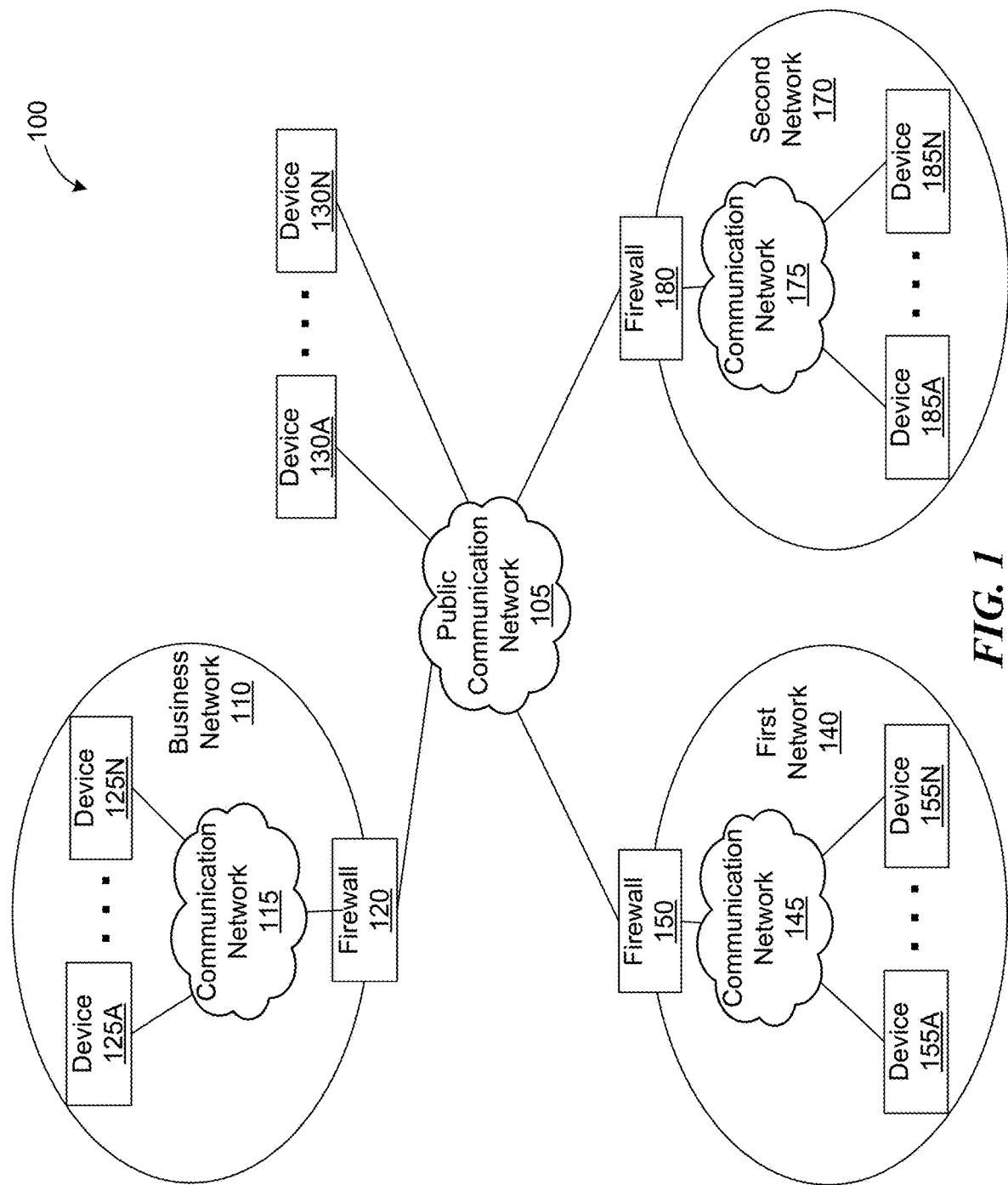
FIG. 1 is an illustration of a networking environment, consistent with various embodiments.

Introduced here is a technique for monitoring network communications. Some techniques for monitoring network communications suffer some deficiencies. For example, some security applications are installed with enhanced privileges to enable the security application to access network traffic, such as by use of privileged commands or resources. Because the security application is installed with enhanced privileges, security holes in the security application can be exploited by attackers to gain access to privileged commands, resources, etc., thereby enabling a possibly major security breach. Other security applications are installed as a standard application where a user needs to launch the security application after each reboot or power-on of the computer system on which the security application is installed. When a user neglects to launch the security application, the computer system is not protected by the security application, once again enabling a possibly major security breach.

Yet other security applications rely on remote servers for analyzing network communications. In an example, a user installs a security application that directs monitored network communications to a remote server, where the network communications are analyzed to determine if they indicate a security threat. Such a technique suffers various deficiencies, for example: adding significant latency to data access, resulting in, e.g., degraded performance when web browsing; increasing communication network usage, resulting in increased data charges for a cellular carrier; or increasing the power consumption of the computer system, resulting in a shorter battery life when the computer system is a battery powered device, such as a smart phone.

Various embodiments of the techniques disclosed herein are able to avoid some or all of the above mentioned deficiencies. In an example, rather than being installed with elevated privileges to enable access to network traffic, a security application is installed as an operating system extension and utilizes a network extension service of the operating system. Examples of operating systems include Mac OS, iOS, Android, Windows, Linux, Chrome OS, HP-UX, SCO Unix, Solaris, BSD, and FreeBSD. By using a network extension service, such as a virtual private network (VPN) stack of the operating system, the security application is able to access network traffic while executing in, e.g., a non-privileged sandboxed process controlled by the operating system. Executing in a non-privileged sandboxed process enhances security by preventing the security application from being able to access certain sensitive resources, such as protected system resources or resources attributed to other applications. When a security application is executing in a sandboxed process, an attacker that exploits a security hole of the security application is prevented from accessing these sensitive resources, resulting in improved security.

Further, because the security application of this example is installed as an operating system extension, the security application is initialized each time that the operating system is initialized, such as when the computer system is rebooted or powered on. At each reboot or power on, the operating system is initialized and, at a certain point during initialization, begins to initialize operating system extensions, which include the security application. As a result, a user does not need to remember to launch the security application. The security application, due to being an operating system extension, is launched each time the operating system is initialized.

In an example where a security application utilizes the VPN stack, the security application intercepts network traffic by conceptually creating a VPN tunnel that starts and ends at the computer system. A typical VPN tunnel provides protected communication between two computer systems, where data sent via the VPN tunnel is encrypted while traveling between the two computer systems. In this example, rather than creating a true VPN tunnel between two computer systems, the security application utilizes the VPN stack to intercept network traffic before the network traffic is transmitted to a communication network or to any other computer. By utilizing the VPN stack, or other network extension service, the security application is able to locally analyze the network traffic to determine if the traffic indicates a potential security threat. This local analysis advantageously results in reduced data access latency and lower communication network usage as compared to a system that sends network traffic to a remote system for analysis. When a potential security threat is indicated, the security application can prevent the network traffic from being transmitted to a communication network and being delivered to the destination computer system.

In some cases, the local computer system may not be capable of adequately analyzing a portion of the network traffic, or analyzing some or all of the network traffic locally may not be desirable for some reason. In such a case, the security application can send the portion of the network traffic to be analyzed to a remote server for analysis. For example, the security application can create a VPN tunnel between the local computer system and the remote server, and can securely send the portion of the network traffic to the remote server for analysis. In a first scenario, the security application waits for the remote server to complete its analysis of the network traffic that was sent to the remote server by the computer system before transmitting the network traffic to a communication network for delivery to the destination computer system. When the remote server determines that the network traffic indicates a potential security threat, the remote server notifies the security application and the security application prevents the network traffic from being transmitted to a communication network and being delivered to the destination computer system. When the remote server determines that the network traffic does not indicate a potential security threat, the security application transmits the network traffic to the communication network where it is delivered to the destination computer system.

In a second scenario, the security application sends the network traffic to the remote server for analysis, but does not wait for the remote server to complete its analysis before transmitting the network traffic to a communication network for delivery to the destination computer system, resulting in reduced latency of data access. If the remote server determines that the network traffic indicates a potential security threat, the remote server notifies the security application and the security application prevents any additional network traffic destined for the destination computer system from being delivered. When the remote server is able to make the determination in a timely fashion, communication with the destination computer system can be stopped before the potential security threat materializes into an actual security breach of the local computer system.

In some embodiments, a person makes a determination whether the network traffic indicates a potential security threat. In an example, the local computer system is being used by a child. When the child accesses unauthorized network data, such as by accessing a website that does not appear in a whitelisted list of websites, the security application intercepts the network traffic and notifies the parent that the child is accessing an un-authorized website, such as by sending a message to the parent's smart phone that causes a notification that indicates the potential security threat to be displayed by the smart phone. The security application prevents the network traffic from being sent to the destination computer system until a response is received from the parent's smart phone. If the smart phone sends a message to the security application that indicates that the parent authorizes the access, the security application adds the website to the whitelisted list of websites, and transmits the network traffic to the communication network for delivery to the destination computer system, enabling the child to access the web site. If the parent denies the access, the security application adds the website to a blacklisted list of websites, and prevents the network traffic from being transmitted to the communication network, resulting in the child being prevented from accessing the website.

The embodiments set forth below represent the necessary information to enable those skilled in the art to practice the embodiments, and illustrate the best mode of practicing the embodiments. Upon reading the following description in light of the accompanying figures, those skilled in the art will understand the concepts of the disclosure and will recognize applications of these concepts that are not particularly addressed here. It should be understood that these concepts and applications fall within the scope of the disclosure and the accompanying claims.

The purpose of terminology used herein is only for describing embodiments and is not intended to limit the scope of the disclosure. Where context permits, words using the singular or plural form may also include the plural or singular form, respectively.

As used herein, unless specifically stated otherwise, terms such as "processing," "computing," "calculating," "determining," "displaying," "generating," or the like, refer to actions and processes of a computer or similar electronic computing device that manipulates and transforms data represented as physical (electronic) quantities within the computer's memory or registers into other data similarly represented as physical quantities within the computer's memory, registers, or other such storage medium, transmission, or display devices.

As used herein, terms such as "connected," "coupled," or the like, refer to any connection or coupling, either direct or indirect, between two or more elements. The coupling or connection between the elements can be physical, logical, or a combination thereof. References in this description to "an embodiment," "one embodiment," or the like, mean that the particular feature, function, structure, or characteristic being described is included in at least one embodiment of the present disclosure. Occurrences of such phrases in this specification do not necessarily all refer to the same embodiment. On the other hand, the embodiments referred to also are not necessarily mutually exclusive.

As used herein, terms such as "cause" and variations thereof refer to either direct causation or indirect causation. For example, a computer system can "cause" an action by sending a message to a second computer system that commands, requests, or prompts the second computer system to perform the action. Any number of intermediary devices may examine and/or relay the message during this process. In this regard, a device can "cause" an action even though it may not be known to the device whether the action will ultimately be executed.

Note that in this description, any references to sending or transmitting a message, signal, etc. to another device (recipient device) mean that the message is sent with the intention that its information content ultimately be delivered to the recipient device; hence, such references do not mean that the message must be sent directly to the recipient device. That is, unless stated otherwise, there can be one or more intermediary entities that receive and forward the message/signal, either "as is" or in modified form, prior to its delivery to the recipient device. This clarification also applies to any references herein to receiving a message/signal from another device; i.e., direct point-to-point communication is not required unless stated otherwise herein.

As used herein, unless specifically stated otherwise, the term "or" can encompass all possible combinations, except where infeasible. For example, if it is stated that data can include A or B, then, unless specifically stated otherwise or infeasible, the data can include A, or B, or A and B. As a second example, if it is stated that data can include A, B, or C, then, unless specifically stated otherwise or infeasible, the data can include A, or B, or C, or A and B, or A and C, or B and C, or A and B and C.

FIG. 1 is an illustration of a networking environment, consistent with various embodiments. Network environment 100 includes three networks that are each protected by a firewall: business network 110, first network 140, and second network 170. Each of the three networks includes a communication network that enables data communication between computing devices that are members of the network. For example, business network 110 includes communication network 115, which includes a plurality of devices (e.g., device 125A, device 125N, etc., referred to collectively as "devices 125"), which enables devices 125 to communicate with each other, with firewall 120, etc. First network 140 includes communication network 145, which includes a plurality of devices (e.g., device 155A, device 155N, etc., referred to collectively as "devices 155"), which enables devices 155 to communicate with each other, with firewall 150, etc. Second network 170 includes communication network 175, which includes a plurality of devices (e.g., device 185A, device 185N, etc., referred to collectively as "devices 185") which enables devices 185 to communicate with each other, with firewall 180, etc.

The firewall of each of the three networks acts as a barrier to protect the network by keeping unauthorized network traffic out of the network. For example, firewall 120 protects business network 110, firewall 150 protects first network 140, and firewall 180 protects second network 170. Public communication network 105 is a public network, such as the Internet or any other public network. Public communication network 105, which includes a plurality of devices (e.g., device 130A, device 130N, etc., referred to collectively as "devices 130"), enables devices 130, firewall 120, firewall 150, firewall 180, etc. to all communicate with each other.

Communication networks 115, 145, and 175, and public communication network 105 can be any type of network that enables data communication between computers. In various embodiments, one or more of communication networks 115, 145, and 175, and public communication network 105 are or include any of a local area network (LAN), a wide area network (WAN), a virtual private network (VPN), a private network, a public network, a cellular network, a short-range wireless network, a wireless local area network (WLAN), etc. The cellular network can be any of various types, such as code division multiple access (CDMA), time division multiple access (TDMA), global system for mobile communications (GSM), long term evolution (LTE), 2G, 3G, 4G, etc. The short-range wireless network, which is used for short-range wireless communications, can also be any of various types, such as Bluetooth, Bluetooth low energy (BLE), near field communication (NFC), etc. The WLAN can similarly be any of various types, such as the various types of IEEE 802.11 networks, among others. Public communication network 105 can be any type of public communication network, such as the Internet.

Devices 125, 130, 155, and 185 can be any type of computing device, such as a desktop computer, a laptop computer, a file server, a network attached storage (NAS) device, a mobile device, or a server, among others. Examples of mobile devices include smart phones, tablets, portable media devices, wearable devices, laptops, and other portable computers. In some embodiments, first network 140 represents a cloud storage or cloud compute provider, and second network 170 represents a home network.

Figure 2:
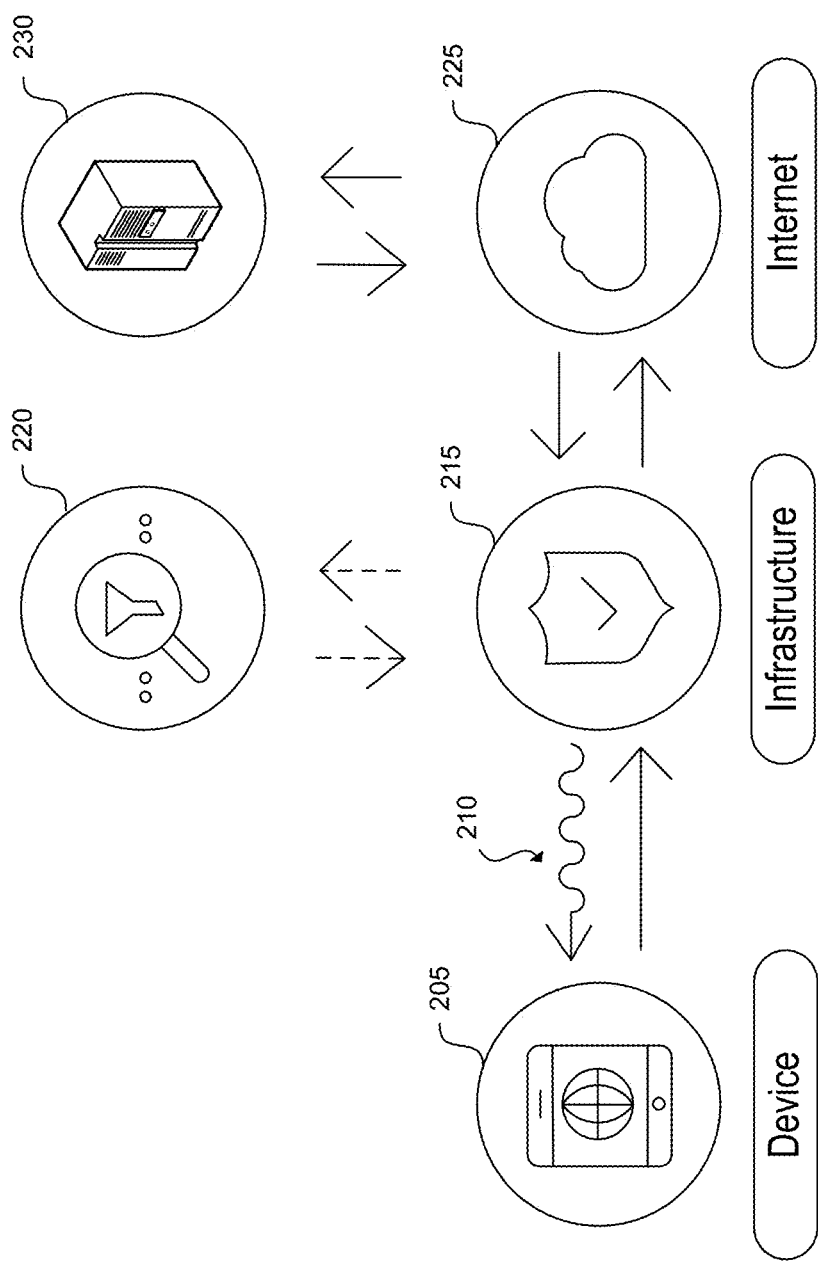
FIG. 2 is an illustration of a first network traffic inspection environment, consistent with various embodiments.

FIG. 2 is an illustration of a first network traffic inspection environment, consistent with various embodiments. In the example of FIG. 2, smartphone 205 can be device 185A of FIG. 1, computer 215 can be device 125A, Internet 225 can be public communication network 105, and security application 220 can be executing on computer 215, or another computer. Many other configurations are possible, and this is just one possible configuration. In the example of FIG. 2, a user utilizes a web browser of smartphone 205 to access a website. The user inputs a Uniform Resource Locator (URL), and, when the host section of the URL is not an Internet Protocol (IP) address, the host section of the URL is translated to an IP address by use of a Domain Name Service (DNS). The IP address in this example happens to be the IP address of destination computer 230. Smartphone 205 creates and sends one or more IP packets via a cellular network to initiate the website access. An IP packet can be an Internet Protocol Version 4 (IPv4) packet, or an Internet Protocol Version 6 (IPv6) packet, among others. Smartphone 205 sends the IP packets for delivery to destination computer 230, which hosts the website. The IP packets, which include the IP address associated with the URL, are intercepted by communication channel 210, which is a VPN tunnel between smartphone 205 and computer 215. The IP packets intercepted by communication channel 210 are sent to computer 215 for analysis by a security application, which can be executing on computer 215 or another computer.

As the IP packets are sent between smartphone 205 and computer 215, data charges from the cellular service provider are incurred. Computer 215 sends the IP packets to the security application. The security application determines that the IP packets do not indicate a security threat, and computer 215 forwards the packets for delivery to destination computer 230 via Internet 225. Destination computer 230 sends the requested website data to computer 215 via Internet 225, and computer 215 forwards the website data to smart phone 205 by use of communication channel 210. The user of smart phone 205 is annoyed due to the slow response to his website data request. He is further annoyed when he receives his bill from his cellular provider, and sees how much in data charges he has incurred.

Figure 3A:
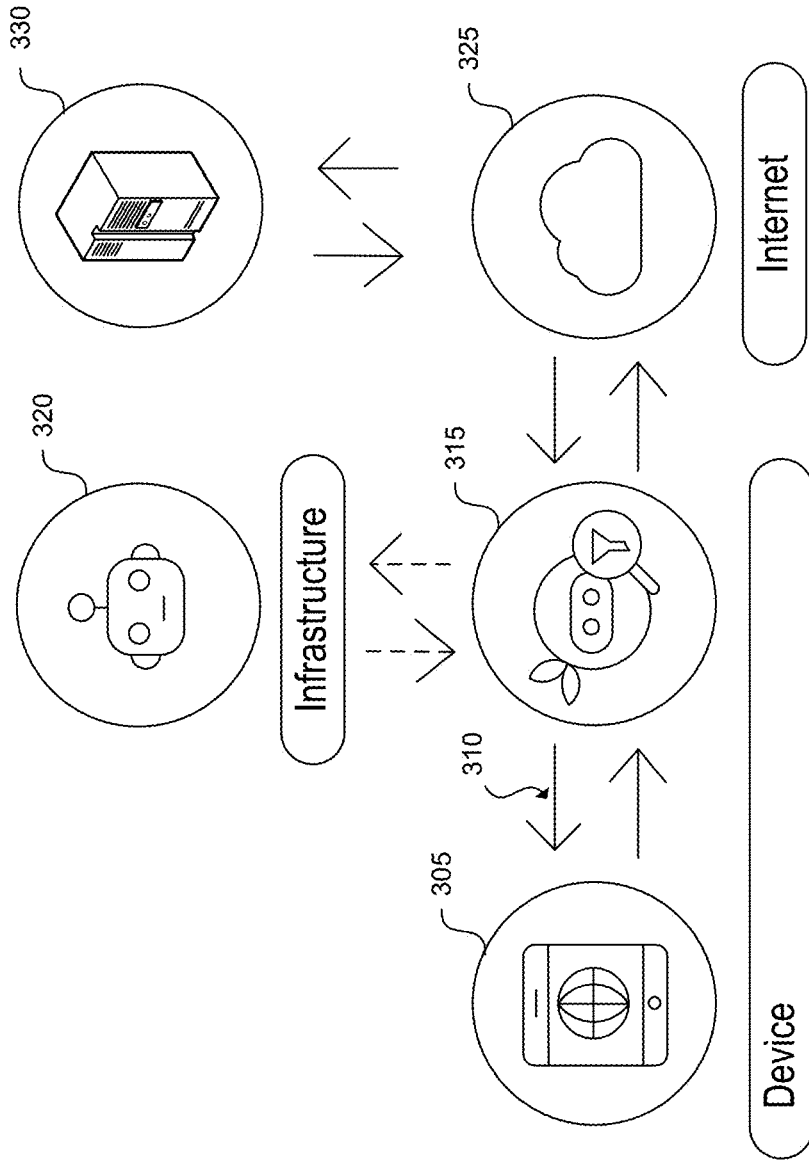
FIG. 3A is an illustration of a second network traffic inspection environment, consistent with various embodiments.
Figure 3B:
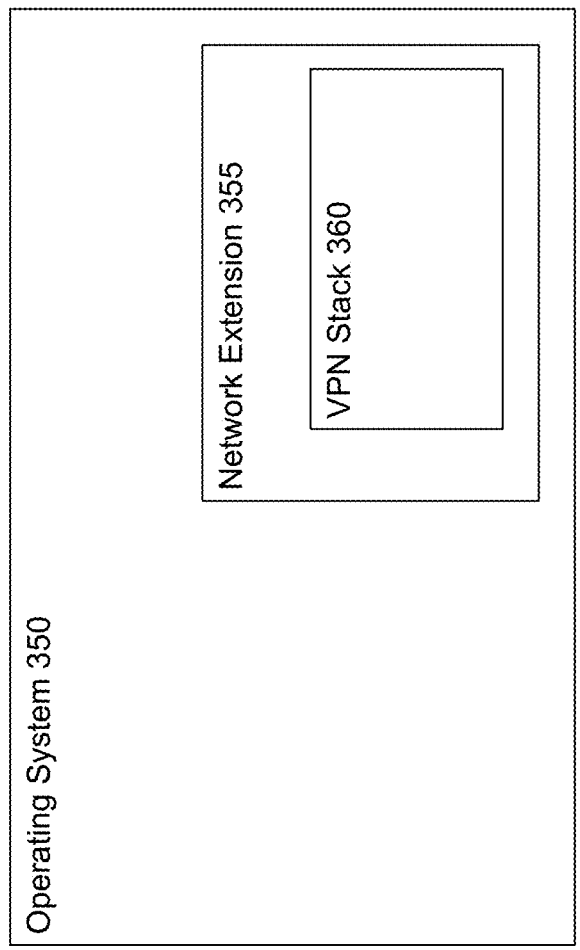
FIG. 3B is a block diagram illustrating networking components of an operating system running at a computer at the second network traffic inspection environment, consistent with various embodiments.

FIG. 3A is an illustration of a second network traffic inspection environment, consistent with various embodiments. In the example of FIG. 3A, smartphone 305 can be device 185A of FIG. 1 and is running operating system 350 of FIG. 3B, computer 320 can be device 125A, Internet 325 can be public communication network 105, and security application 315 is executing at smartphone 305. Many other configurations are possible, and this is just one possible configuration. In the example of FIGS. 3A and 3B, a user utilizes a web browser of smartphone 305 to access a website. The user inputs a URL, and the URL is translated to an IP address, which corresponds to destination computer 330, by smartphone 305, in some embodiments with the assistance of operating system 350. Smartphone 305 creates and sends one or more IP packets to initiate the website access, and sends the IP packets for delivery to destination computer 330, which hosts the website. However, the IP packets are intercepted by communication extension 310, which in this example is an extension of operating system 350, namely, network extension 355, before the IP packets are transmitted to a communication network. Communication extension 310 is implemented by use of a network extension service of the operating system. In this example, network extension 355 utilizes a VPN stack of the operating system, namely, VPN stack 360, in order to intercept network traffic before the traffic is transmitted to a communication network.

For IP packets that are analyzed by security application 315, advantageously no data charges are incurred from the cellular service provider as a result of analysis because the IP packets are analyzed by security application 315 before the data is transmitted to a communication network. In some cases, security application 315 when running on smartphone 305 may not be able to adequately analyze all IP packets, or it may be otherwise undesirable to analyze some or all of the IP packets locally. In those cases, security application 315 can send the packets to be further analyzed to computer 320, which may be a cloud computer, for analysis. When security application 315 determines that the IP packets indicate a security threat, security application 315 prevents the IP packets from being transmitted to a communication network, such as Internet 325. Security application 315 causes a message to be displayed on smartphone 305, such as message 605 of FIG. 6. When security application 315 determines that the IP packets do not indicate a security threat, security application 315 allows the IP packets to be transmitted to a communication network for delivery to destination computer 330.

Figure 4:
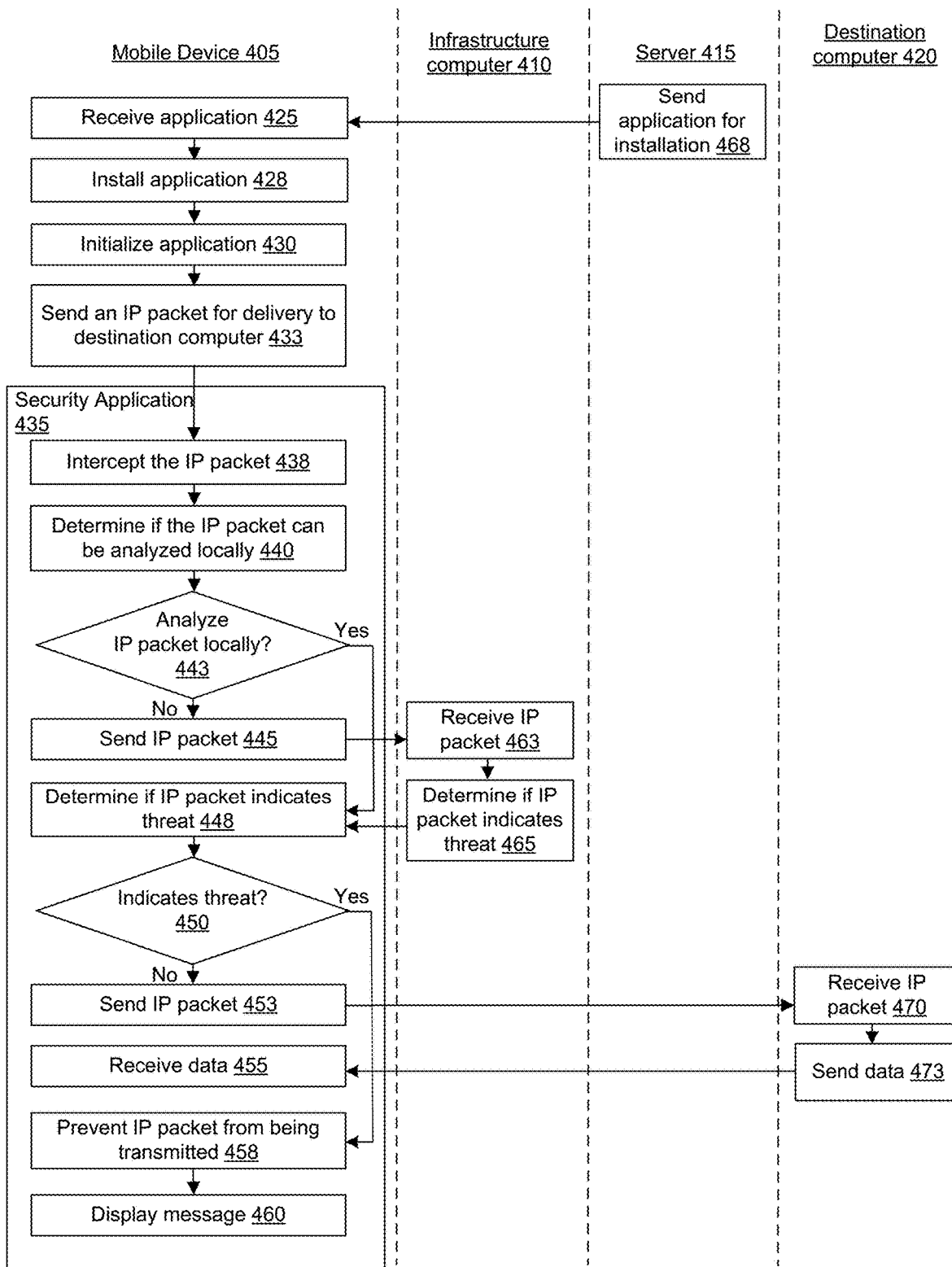
FIG. 4 is an illustration of a method for inspecting network traffic, consistent with various embodiments.
Figure 5:
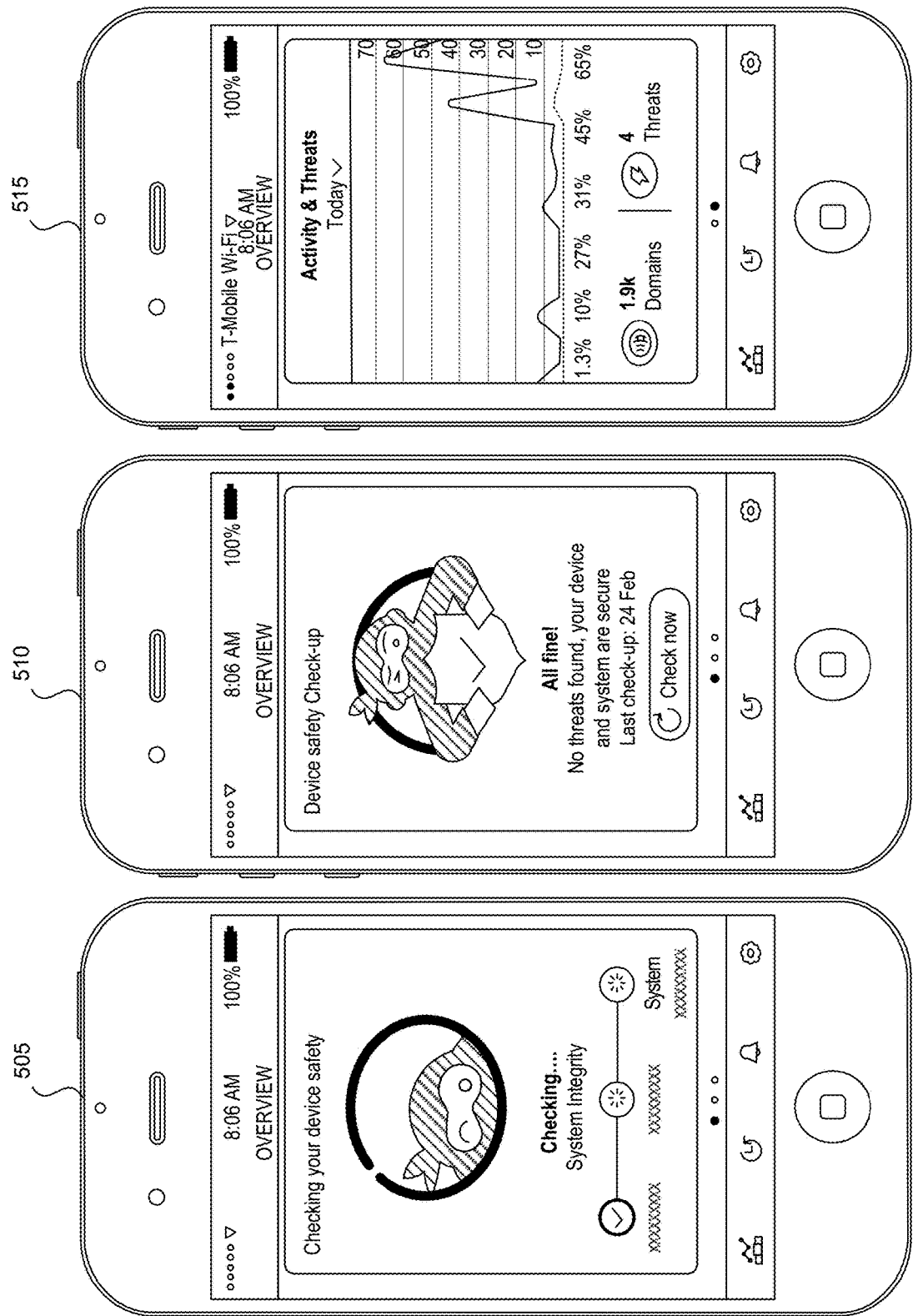
FIGS. 5 and 6 are illustrations of security-related messages being displayed on mobile devices, consistent with various embodiments.

FIG. 4 is an illustration of a method for inspecting network traffic, consistent with various embodiments. In the example of FIG. 4, mobile device 405 can be device 185A of FIG. 1, infrastructure computer 410 can be device 125A, server 415 can be device 125N, and destination computer 420 can be device 155A. Many other configurations are possible, and this is just one possible configuration. A user has a friend who had his identity stolen, and who has been spending a lot of time trying to recover from this criminal act. After some exploration, the user has discovered that there are many ways that a user's online security can be jeopardized. During his investigation, he came across a number of examples of security threats, such as phishing, spear-phishing, smishing, infiltration and exfiltration from botnets, as well as the examples illustrated in FIGS. 7A-7E. The user decides to download a security application. He uses his mobile device to navigate to an online application store, where he initiates the download and install of the security application. While the user of this example is using a mobile device, the user can be using any type of computing device. At block 468, server 415 sends a download package for the security application to the user's mobile device, mobile device 405, where at block 425, mobile device 405 receives the download package for the security application.

At block 428, mobile device 405 installs the security application as an operating system extension, and at block 430, the mobile device initializes/launches the security application. An operating system extension is software that extends the operating system's functionality, and that is initiated/launched at startup time (e.g., at power on, reboot, etc. of the device) by the operating system. Typical applications are not installed as operating system extensions. As a result, a user needs to remember to initialize/launch such applications. Further, a typical application may not be able to access certain sensitive resources, unless installed with elevated privileges. To enable access to certain resources, some applications are installed with elevated privileges, with a resulting increase in the potential severity of damage that can result from an attack that takes advantage of any security hole in the application.

When a software program, also referred to as an application, is installed as an operating system extension, the operating system can execute the software program in a sandboxed process, which is a restricted operating system environment where access to resources can be controlled by the operating system. Sandboxing is a security technique that isolates programs, preventing malicious or malfunctioning programs, such as a program that has suffered a security breach from an attack that takes advantage of a security hole of the program, from accessing, damaging, or snooping on protected resources of a user's computer.

After the security application is installed and initialized, the user selects and launches an application, and the selected application generates some network traffic. The selected application can be any application that generates network traffic, such as a web browser or any other application that communicates with other computers via a network. At block 433, the selected application sends an IP packet for delivery to destination computer 420. In some embodiments, the selected application sends the IP packet for delivery to destination computer 420 when the selected application sends a message that prompts generation of the IP packet and that indicates to deliver the IP packet to destination computer 420. For example, the selected application can send the IP packet for delivery to destination computer 420 by sending a message that includes a URL of a webpage that is hosted by destination computer 420, or by sending any other message that prompts generation of the IP packet and that indicates to deliver the IP packet to destination computer 420.

At block 438, the security application, represented by security application 435 in FIG. 4 (which indicates the blocks executed/caused/triggered/etc. by security application 435 in the example of FIG. 4 by enclosing the blocks), intercepts the IP packet. In some embodiments, the security application utilizes functionality available via a network extension service of the operating system to intercept or monitor network traffic. In some embodiments, a network extension service is a framework that contains application program interfaces (APIs) that can be used to customize and extend the core networking features of the operating system. In an example, the network extension service utilizes functionality available via a VPN stack of the operating system to enable interception or monitoring of network traffic. In another example, the network extension service is the VPN stack of the operating system. A networking extension service can be, for example, network extension 355 of FIG. 3B, and a VPN stack can be VPN stack 360.

The IP packet can be intercepted by the security application in any of various ways. In a first example where the selected application sends the IP packet by sending a message that includes a URL that indicates destination computer 420, the security application intercepts the IP packet by intercepting a message that includes the URL (block 438). In a second example where the selected application sends the IP packet by sending a message that includes a URL that indicates destination computer 420, the operating system, in combination with other communications/networking functionality of mobile device 405, maps the URL to the IP address of destination computer 420 and generates an IP packet for delivery to destination computer 420. Before the IP packet is transmitted to a communication network, such as a cellular network, the IP packet is intercepted by the security application (block 438).

At block 440, the security application determines whether the IP packet can be analyzed locally, such as to determine if the IP packet indicates a security threat. Analyzing the IP packet locally can have several advantages, such as reduced network traffic due to not sending the IP packet to a remote device, increased privacy and reduced latency due to not sending the IP packet to a remote device for analysis, increased robustness due to not sending the IP packet to a remote server that may be susceptible to, e.g., a denial of service attack, or for other reasons. The determination as to whether to analyze the IP packet locally can be based on any of various factors. For example, the determination can be based on the processing power of the local device, the memory storage capacity of the local device, the data or other resources available to the local device, the amount of power that performing the analysis locally would consume, the current utilization of the local device, etc. When the security application determines to analyze the IP packet locally (block 443), the security application determines whether the IP packet indicates a threat (448) based on an analysis of the IP packet performed locally. When the security application determines to analyze the IP packet remotely (block 443), the security application determines whether the IP packet indicates a threat (448) based on an analysis of the IP packet transmitted (445)/performed remotely upon receipt (463/465). The determination by the security application as to whether the IP packet indicates a threat (448) can in turn be based on a determination by a remote computer, e.g., infrastructure computer 410 in the example of FIG. 4, that the packet indicates a threat (block 465), and may also additionally be based on analysis performed by the local device (e.g., mobile device 405).

The determination whether an IP packet indicates a threat (block 448/465) can be based on any of various analyses. In some embodiments, an analysis of an IP packet includes an analysis of other IP packets that are associated with the IP packet. In yet other embodiments, an analysis of an IP packet includes an analysis of other data that is associated with the IP packet, such as an email message, a short message system (SMS) message, a domain name, etc., among others. In some cases, the IP address or domain name indicating the destination of the IP packet is compared against a blacklist of IP addresses or domain names, where the blacklisted IP addresses and domain names indicate a security threat, or against a whitelist of IP addresses or domain names, where the whitelisted IP addresses and domain names do not indicate a security threat. For example, a user may be fooled by the phishing message of FIG. 7A, and may click on CHANGE PASSWORD in response to the phishing message. When the user clicks on CHANGE PASSWORD, mobile device 405 attempts to communicate with a phishing website and sends an IP packet for delivery to the phishing website (block 433). The security application intercepts the IP packet (block 438), and, depending on block 443, mobile device 405 or infrastructure computer 410 determines that an IP address indicated by the IP packet appears in a blacklist of IP addresses, and determines that the IP packet indicates a threat (block 448/465).

In other cases, an email message that includes a website link that a user clicks on is analyzed as part of analyzing the IP packet. For example, a user may receive the email message of FIG. 7B or of FIG. 7D. The user, being fooled by the email message, which may be a phishing email, clicks on a website link contained within the message. In response, mobile device 405 attempts to communicate with the website that is associated with the website link and sends an IP packet for delivery to the website (block 433). The security application intercepts the IP packet (block 438), detects that the IP packet was sent in association with clicking on the website link in the email message, and, depending on block 443, mobile device 405 or infrastructure computer 410 analyzes the email message as part of analyzing the IP packet. For the email of FIG. 7B, the analysis includes analyzing the email address of the sender, express@ssl1-airnb.com, which appears in the message of FIG. 7B. For the email of FIG. 7C, the analysis includes analyzing the domain name of the website, update-apple.uk, which appears in the message of FIG. 7C. For the email of FIG. 7D, the analysis includes analyzing the domain name of the website, which, while it is not visible in the email, is accessible via the message of FIG. 7D, such as via a URL included in the message of FIG. 7D and accessible via the website link.

The domain names of these examples raise suspicion in, e.g., at least two ways. First is that the domain name associated with the email address (ssl1-airnb.com) or the URL (update-apple.uk) is each similar to a well-known domain name (airnb.com or apple.com), and second is that the ssl1-airnb.com domain name includes a potentially misleading character, in that the hyphen between ssl1 and airnb can be interpreted by a user to indicate a subdomain (e.g., to indicate that ssl1 is a subdomain of airnb, as ssl1.airnb would properly indicate that ssl1 was a subdomain of airnb). For the email of FIG. 7D, the analysis includes analyzing the email, which indicates that the email includes a link to a Google doc, and includes analyzing the website link (activated by clicking on "Open in Docs"). The website link raises a suspicion because it is not a link to a Google doc, nor even to a valid Google website. Based on these suspicions, mobile device 405 or infrastructure computer 410 determines that the IP packet indicates a threat (block 448/465). In some cases, the domain name may appear in a list of whitelisted or blacklisted domain names.

In yet other cases, an SMS message that includes a website link that a user clicks on is analyzed as part of analyzing the IP packet. For example, a user may receive the SMS message of FIG. 7E. The user, being fooled by the SMS message, clicks on https://icloud.com/FindMyiPhone/, which is a website link contained in the message. The user is fooled in that he does not recognize that the "i" in icloud is not an "i," but rather is the international character "î" (i-circumflex, a letter in, e.g., the Friulian, Kurdish, and Romanian alphabets). This is especially hard to detect on a smartphone, where displayed characters are quite small. In response, mobile device 405 attempts to communicate with the website that is associated with the website link and sends an IP packet for delivery to the website (block 433). The security application intercepts the IP packet (block 438), detects that the IP packet was sent in association with clicking on the website link in the SMS message, and, depending on block 443, mobile device 405 or infrastructure computer 410 analyzes the URL of the website link, and may also analyze the SMS message, as part of analyzing the IP packet.

The URL raises a suspicion in, e.g., two ways. First is that the domain name associated with the email address (icloud.com) is similar to a well-known domain name (e.g., icloud.com), and second is that the domain name includes a potentially misleading character, in that the domain name includes an international character that is similar to an English character. Based on these suspicions, mobile device 405 or infrastructure computer 410 determines that the IP packet indicates a threat (block 448/465).

In some cases, a user's pattern of behavior is analyzed as part of analyzing the IP packet. For example, network traffic generated by a user when the user is browsing various websites, running various applications that communicate with remote computers, etc., can be analyzed to determine if the pattern of behavior exhibits anomalous or otherwise suspicious behavior. Examples of suspicious behavior include, for example, sending login ID or password information to an unknown website, accessing a new website that is not related to any previously visited websites, accessing multiple blacklisted websites over a period of time, attempting and failing to log in to a previously visited website multiple times, etc. The analysis can be performed by use of a machine learning algorithm, among others, and can be based on a historic pattern of usage as indicated by historic intercepted network traffic.

In yet other cases, analysis of an IP packet can include analysis by a human being of the IP packet or of any other data associated with the IP packet. For example, a child may access a website by clicking on a URL via mobile device 405, and mobile device 405 may send an IP packet for delivery to the host of the website (block 433). The security application intercepts the IP packet (block 438), and, depending on block 443, mobile device 405 or infrastructure computer 410 analyzes the URL as part of analyzing the IP packet and detects that the IP packet was sent to a previously unvisited website. A determination is made that the child has not visited the website associated with this URL, and the URL is sent to the mobile device of the child's parent or an adult who is supervising the child for review and approval. A determination is made whether the IP packet indicates a threat (block 448/465) based on the response received from the parent or adult supervisor.

In some cases, analysis of an IP packet can include analysis by a policy engine that decides what to do with the packet, such as letting the packet pass through, blocking the packet, modifying the packet, or replacing the packet with a different packet, among others. The policy engine can be part of a privilege-less virtual network interface (PVNI) of an operating system, which can use the policy engine to control flow of network traffic. The analysis of the IP packet can include, for example, the following steps: setup of a PVNI by starting a PVNI privileged daemon, which bridges the data flow that goes from the policy engine(s) to the kernel. Creation of a virtual network interface, e.g., vir0, as well as a routing table policy is performed, so that all traffic coming and going to the target application(s) goes through vir0. As a form of example, in an example Linux system, the PVNI privileged daemon runs as root, and the virtual network interface is represented as utun0, and there is only one instance of this daemon. Finally, the PVNI policy engine daemon is started, which enables use of a user-mode process to inspect the network traffic.

When a determination is made that an IP packet does not indicate a threat (block 450), the security application sends the IP packet (block 453) to destination computer 420, where the packet is received (block 470). Destination computer 420 responds by sending the requested data (block 473) to mobile device 405, where the data is received (block 455) and forwarded to the application that requested the data.

Figure 6:
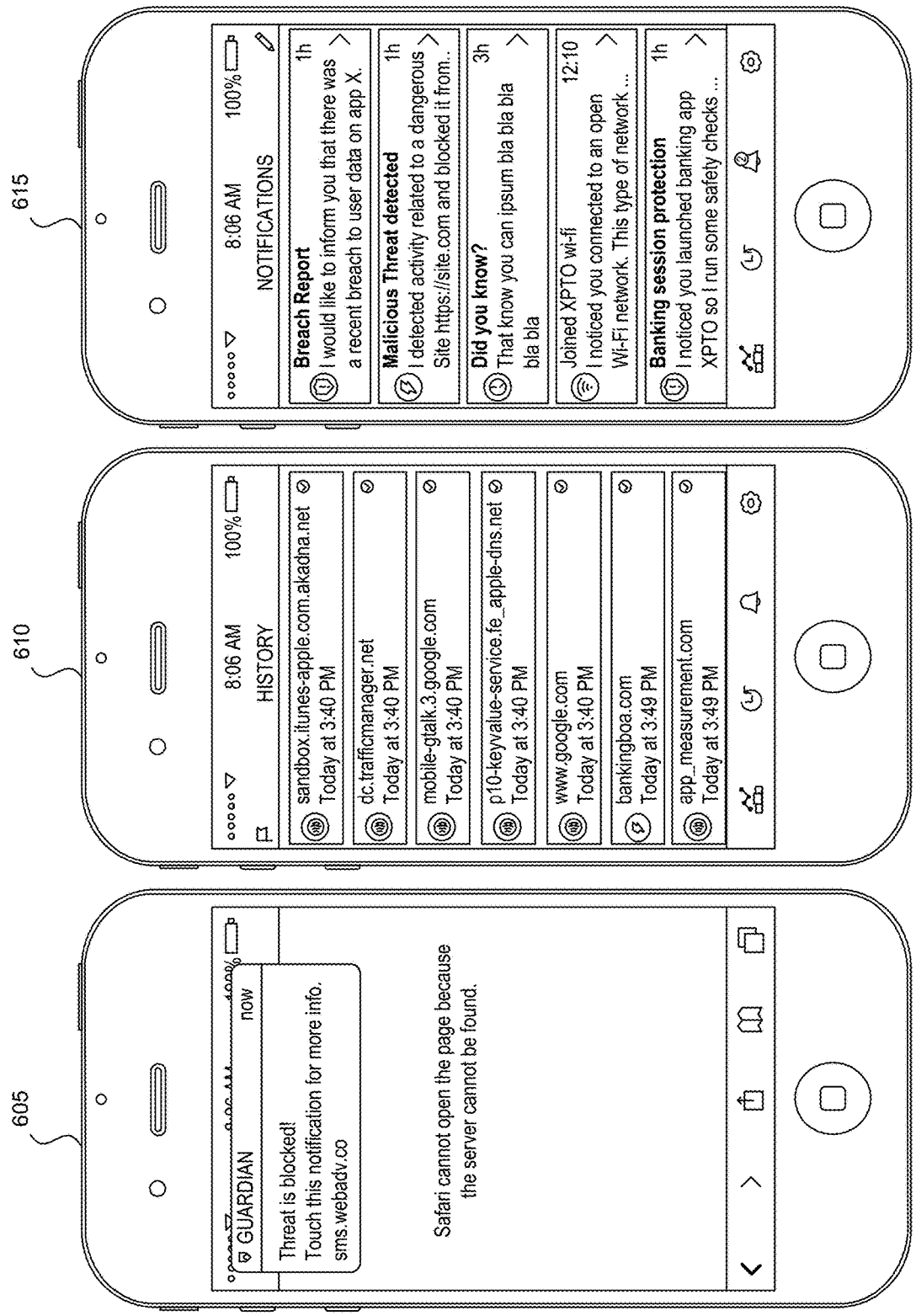
Figure 7A:
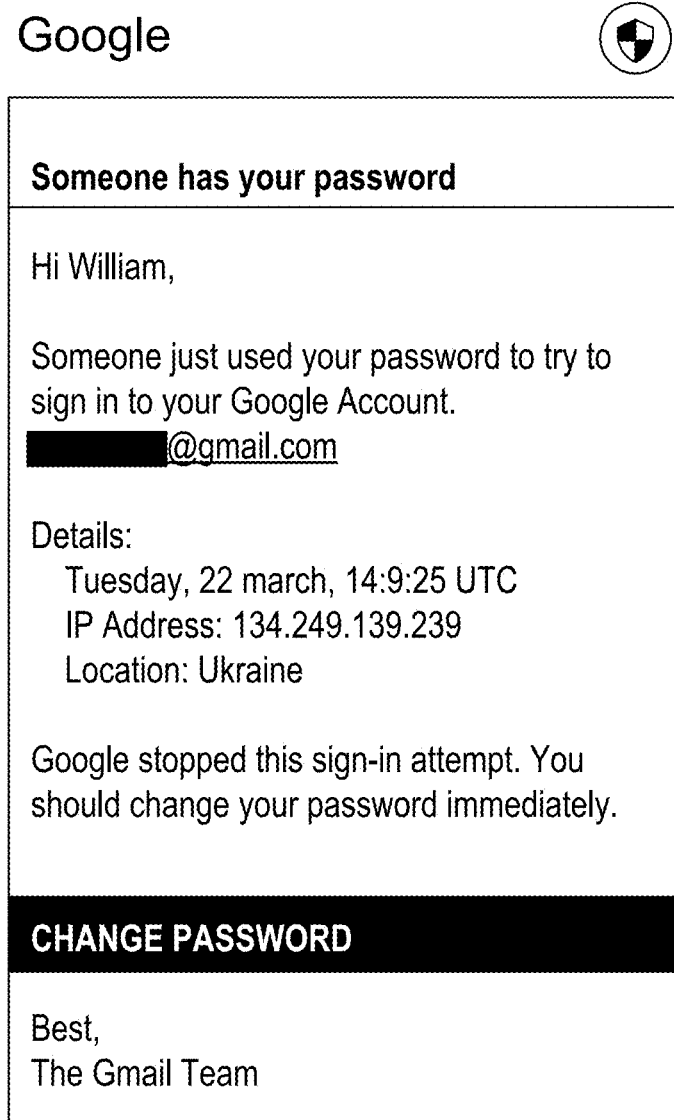
Figure 7C:
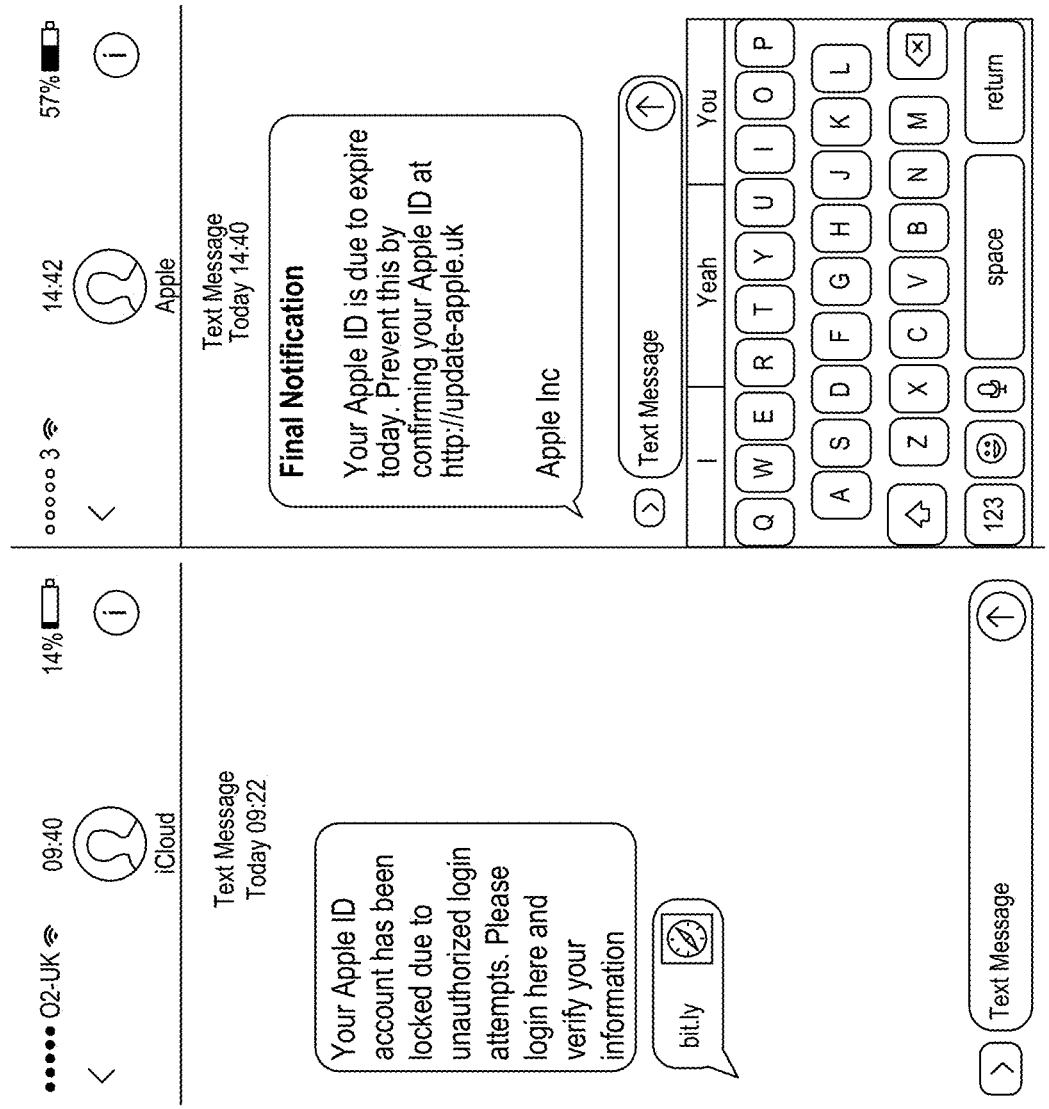
Figure 7D:
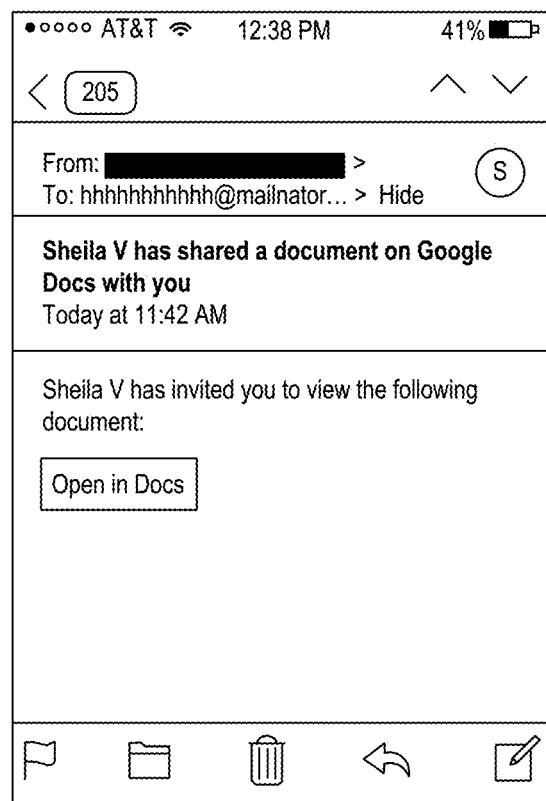

When a determination is made that an IP packet does indicate a threat (block 450), the security application prevents the IP packet from being transmitted (block 458) and displays a message (block 460) on mobile device 405, such as any of the messages displayed on mobile devices 605, 610, or 615 of FIG. 6. In some embodiments, the message displayed (block 460) indicates that a potential security threat was detected and the data access is blocked. In some embodiments, the security application, rather than preventing the IP packet from being transmitted, modifies the IP packet before transmission. For example, the IP packet can be modified to remove sensitive data, such as a login ID, a password, etc.

In some cases, the determination as to whether an IP packet indicates a threat (block 448/465) may take enough time that the user's perception of the performance of accessing remote data may be negatively impacted. For example, a determination made by a remote computer, such as infrastructure computer 410, made based on input from a human being, etc., may take enough time that a user would be unhappy with the performance. In some embodiments, rather than waiting for a determination to be made as to whether an initial IP packet indicates a threat (block 448/465), the initial IP packet is transmitted to a network for delivery to destination computer 420. Subsequent related IP packets, also sent for delivery to the destination computer (block 433) before a determination is made as to whether the initial IP packet indicates a threat, are similarly transmitted to the network for delivery to destination computer 420. Once a determination is made whether the initial IP packet indicates a threat (block 448/465), and if the determination is that the initial IP packet does indicate a threat (block 450), subsequently sent IP packets are prevented from being transmitted to the network for delivery to destination computer 420 (block 458), and subsequently received data from destination computer 420 is discarded without being forwarded to the requesting application.

In some embodiments, rather than determining if an IP packet indicates a threat and preventing the IP packet from being transmitted, the security application can determine if an IP packet indicates data that is particularly sensitive from a security standpoint, such as data transmitted via a banking application to a bank server (e.g., the banking application executing at mobile device 405 and the bank server being destination computer 420), can create a VPN tunnel from mobile device 405 to destination computer 420, and can securely send the data from mobile device 405 to destination computer 420. This can protect against, for example, a rogue WiFi network intercepting data sent between mobile device 405 and destination computer 420.

In some embodiments, rather than determining if an IP packet indicates a threat and preventing the IP packet from being transmitted, the security application can monitor the IP packet to determine application usage. For example, the security application can determine which applications executing at mobile device 405 are most commonly used by a user. This application usage data or statistics can be delivered to people or entities that are interested in the usage data, such as makers of applications, advertising companies, etc.

In some embodiments, rather than determining whether an IP packet indicates a threat, the technique disclosed herein can be used: to detect and prevent trackers, such as SDK-based mobile tracking software, an example being a "hot-mic" SDK; collection of usage statistics based on network traffic patterns, such as detection and measurement of which applications are being used and for how long; detection and measurement of in-app purchases generated by applications; detection and measurement of ad impressions and ad networks used by applications; detection of ecosystem components (e.g., APL SDKs, Ad Network SDKs, Monetization and Growth SDKs, etc.), such as those used by a particular application; tracking bandwidth usage of a shared data plan, such as for personal versus corporate usage; establishing bandwidth limits on non-corporate applications on corporate devices; parental control technology for parents to track, control, or limit their children's use of applications or web browsers on a device; to implement a real-time reputation scoring system on a device, such as: SSL certificate reputation, inspect X509 certificates in real-time, and provide a reputation score in order to prevent access to fake or ill reputed sites; ASN/IP reputation, inspect connections to IP address ranges in real-time and provide a reputation score for the destination IP in order to prevent unauthorized access to C&C servers of known malware, spyware, and ransomware; domain reputation, inspect DNS requests in real-time and provide a reputation score for the domain in order to prevent unauthorized access to C&C servers of known malware, spyware and ransomware; application reputation, by inspecting some or all DNS, IP, and SSL communications, our system can detect application usage by fingerprinting resources of the application, and leveraging this unique potential, our system can then provide a reputation score in real-time for the application that is active.

Figure 8:
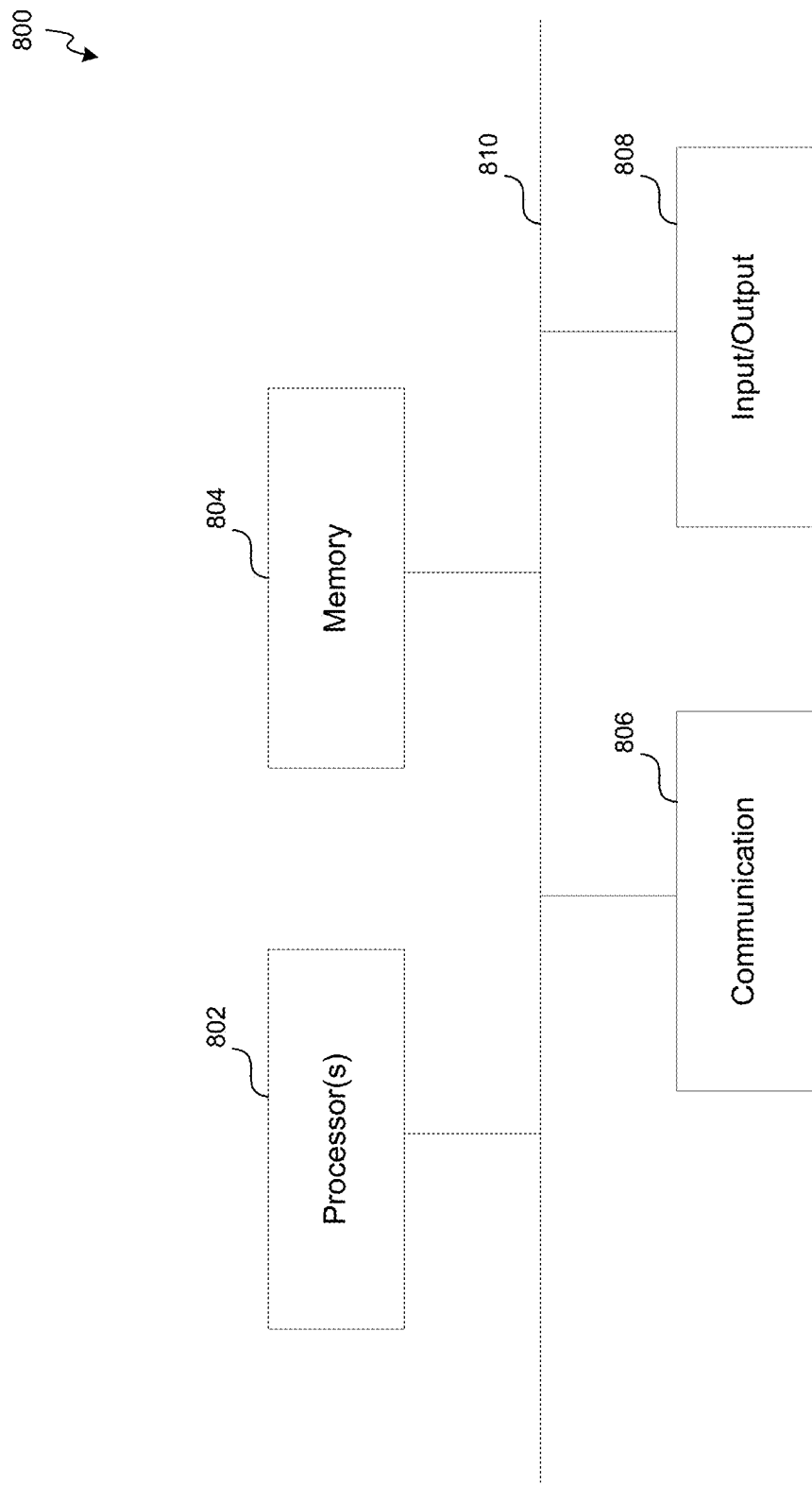
FIG. 8 is a system block diagram illustrating a processing device in which at least some operations described herein can be implemented, consistent with various embodiments.

FIG. 8 is a high-level block diagram illustrating an example of a processing system in which at least some operations described herein can be implemented, consistent with various embodiments. The processing system can be processing device 800, which represents a system that can run any of the methods/algorithms described above. For example, processing device 800 can be any of devices 125A-N, 130A-N, 155A-N, or 185A-N, firewalls 120, 150, or 180, mobile device 405, infrastructure computer 410, server 415, or destination computer 420, among others. A system may include two or more processing devices such as represented in FIG. 8, which may be coupled to each other via a network or multiple networks. A network can be referred to as a communication network.

In the illustrated embodiment, the processing device 800 includes one or more processors 802, memory 804, a communication device 806, and one or more input/output (I/O) devices 808, all coupled to each other through an interconnect 810. The interconnect 810 may be or include one or more conductive traces, buses, point-to-point connections, controllers, adapters, and/or other conventional connection devices. Each of the processors 802 may be, or include, for example, one or more general-purpose programmable microprocessors or microprocessor cores, microcontrollers, application specific integrated circuits (ASICs), programmable gate arrays, or the like, or a combination of such devices. The processor(s) 802 control the overall operation of the processing device 800. Memory 804 may be or include one or more physical storage devices, which may be in the form of random access memory (RAM), read-only memory (ROM) (which may be erasable and programmable), flash memory, miniature hard disk drive, or other suitable type of storage device, or a combination of such devices. Memory 804 may store data and instructions that configure the processor(s) 802 to execute operations in accordance with the techniques described above. The communication device 806 may be or include, for example, an Ethernet adapter, cable modem, Wi-Fi adapter, cellular transceiver, Bluetooth transceiver, or the like, or a combination thereof. Depending on the specific nature and purpose of the processing device 800, the I/O devices 808 can include devices such as a display (which may be a touch screen display), audio speaker, keyboard, mouse or other pointing device, microphone, camera, etc.

While processes or blocks are presented in a given order, alternative embodiments may perform routines having steps, or employ systems having blocks, in a different order, and some processes or blocks may be deleted, moved, added, subdivided, combined, and/or modified to provide alternative or sub-combinations, or may be replicated (e.g., performed multiple times). Each of these processes or blocks may be implemented in a variety of different ways. In addition, while processes or blocks are at times shown as being performed in series, these processes or blocks may instead be performed in parallel, or may be performed at different times. When a process or step is "based on" a value or a computation, the process or step should be interpreted as based at least on that value or that computation.

Software or firmware to implement the techniques introduced here may be stored on a machine-readable storage medium and may be executed by one or more general-purpose or special-purpose programmable microprocessors. A "machine-readable medium," as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Note that any and all of the embodiments described above can be combined with each other, except to the extent that it may be stated otherwise above or to the extent that any such embodiments might be mutually exclusive in function and/or structure.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

Physical and functional components (e.g., devices, engines, modules, and data repositories, etc.) associated with processing device 800 can be implemented as circuitry, firmware, software, other executable instructions, or any combination thereof. For example, the functional components can be implemented in the form of special-purpose circuitry, in the form of one or more appropriately programmed processors, a single board chip, a field programmable gate array, a general-purpose computing device configured by executable instructions, a virtual machine configured by executable instructions, a cloud computing environment configured by executable instructions, or any combination thereof. For example, the functional components described can be implemented as instructions on a tangible storage memory capable of being executed by a processor or other integrated circuit chip. The tangible storage memory can be computer readable data storage. The tangible storage memory may be volatile or non-volatile memory. In some embodiments, the volatile memory may be considered "non-transitory" in the sense that it is not a transitory signal. Memory space and storages described in the figures can be implemented with the tangible storage memory as well, including volatile or non-volatile memory.

Each of the functional components may operate individually and independently of other functional components. Some or all of the functional components may be executed on the same host device or on separate devices. The separate devices can be coupled through one or more communication channels (e.g., wireless or wired channel) to coordinate their operations. Some or all of the functional components may be combined as one component. A single functional component may be divided into sub-components, each sub-component performing a separate method step or method steps of the single component.

In some embodiments, at least some of the functional components share access to a memory space. For example, one functional component may access data accessed by or transformed by another functional component. The functional components may be considered "coupled" to one another if they share a physical connection or a virtual connection, directly or indirectly, allowing data accessed or modified by one functional component to be accessed in another functional component. In some embodiments, at least some of the functional components can be upgraded or modified remotely (e.g., by reconfiguring executable instructions that implement a portion of the functional components). Other arrays, systems, and devices described above may include additional, fewer, or different functional components for various applications.

Aspects of the disclosed embodiments may be described in terms of algorithms and symbolic representations of operations on data bits stored in memory. These algorithmic descriptions and symbolic representations generally include a sequence of operations leading to a desired result. The operations require physical manipulations of physical quantities. Usually, though not necessarily, these quantities take the form of electric or magnetic signals that are capable of being stored, transferred, combined, compared, and otherwise manipulated. Customarily, and for convenience, these signals are referred to as bits, values, elements, symbols, characters, terms, numbers, or the like. These and similar terms are associated with physical quantities and are merely convenient labels applied to these quantities.

While embodiments have been described in the context of fully functioning computers, those skilled in the art will appreciate that the various embodiments are capable of being distributed as a program product in a variety of forms and that the disclosure applies equally, regardless of the particular type of machine or computer-readable media used to actually affect the embodiments.

The invention claimed is:

1. A method, comprising:
    executing an application on a mobile device, wherein the application was previously installed as an operating system extension that uses a virtual private network (VPN) stack of the operating system to create a VPN tunnel that starts and ends on the mobile device to intercept Internet Protocol (IP) packets for delivery to a remote computer system, wherein the operating system extension extends the operating system's functionality, and wherein the operating system extension is initiated by the operating system;
    intercepting, by the application, a first IP packet in the VPN tunnel, using the VPN stack;
    determining an action to take in response to intercepting the first IP packet, wherein the determination is based at least in part on analyzing the packet; and
    taking the determined action.

2. The method of claim 1 wherein determining the action to take includes detecting a tracker.

3. The method of claim 2 wherein the tracker comprises SDK-based mobile tracking software.

4. The method of claim 1 wherein taking the determined action includes preventing tracking.

5. The method of claim 1 wherein determining the action to take includes collecting usage statistics.

6. The method of claim 5 wherein the usage statistics are collected based on network traffic patterns.

7. The method of claim 6 wherein the usage statistics include statistics on one or more applications used.

8. The method of claim 7 wherein the usage statistics include statistics on how long the one or more applications are used.

9. The method of claim 1 wherein determining the action to take includes detecting an in-app purchase generated by an application.

10. The method of claim 1 wherein determining the action to take includes detecting an ad impression associated with an application.

11. The method of claim 1 wherein determining the action to take includes detecting an ad network used by an application.

12. The method of claim 1 wherein determining the action to take includes detecting a software development kit used by an application.

13. The method of claim 1 wherein determining the action to take includes tracking bandwidth usage.

14. The method of claim 13 wherein the bandwidth is associated with a shared data plan.

15. The method of claim 13 wherein taking the determined action includes limiting usage of an application.

16. The method of claim 1 wherein determining the action to take includes determining a reputation score for a site.

17. The method of claim 16 wherein determining the action to take includes evaluating an SSL certificate reputation.

18. The method of claim 16 wherein determining the action to take includes evaluating an X.509 certificate.

19. The method of claim 16 wherein determining the action to take includes evaluating an IP address reputation.

20. The method of claim 16 wherein determining the action to take includes inspecting a DNS request and providing a reputation score for a domain.

21. A system comprising:
    a processor configured to:
        execute an application on a mobile device, wherein the application was previously installed as an operating system extension that uses a virtual private network (VPN) stack of the operating system to create a VPN tunnel that starts and ends on the mobile device to intercept Internet Protocol (IP) packets for delivery to a remote computer system, wherein the operating system extension extends the operating system's functionality, and wherein the operating system extension is initiated by the operating system;
        intercept, by the application, a first IP packet in the VPN tunnel, using the VPN stack;
        determine an action to take in response to intercepting the first IP packet, wherein the determination is based at least in part on analyzing the packet; and
        taking the determined action; and
    a memory coupled to the processor and configured to provide the processor with instructions.

22. The system of claim 21 wherein determining the action to take includes detecting a tracker.

23. The system of claim 22 wherein the tracker comprises SDK-based mobile tracking software.

24. The system of claim 21 wherein taking the determined action includes preventing tracking.

25. The system of claim 21 wherein determining the action to take includes collecting usage statistics.

26. The system of claim 25 wherein the usage statistics are collected based on network traffic patterns.

27. The system of claim 26 wherein the usage statistics include statistics on one or more applications used.

28. The system of claim 27 wherein the usage statistics include statistics on how long the one or more applications are used.

29. The system of claim 21 wherein determining the action to take includes detecting an in-app purchase generated by an application.

30. The system of claim 21 wherein determining the action to take includes detecting an ad impression associated with an application.

31. The system of claim 21 wherein determining the action to take includes detecting an ad network used by an application.

32. The system of claim 21 wherein determining the action to take includes detecting a software development kit used by an application.

33. The system of claim 21 wherein determining the action to take includes tracking bandwidth usage.

34. The system of claim 33 wherein the bandwidth is associated with a shared data plan.

35. The system of claim 33 wherein taking the determined action includes limiting usage of an application.

36. The system of claim 21 wherein determining the action to take includes determining a reputation score for a site.

37. The system of claim 36 wherein determining the action to take includes evaluating an SSL certificate reputation.

38. The system of claim 36 wherein determining the action to take includes evaluating an X.509 certificate.

39. The system of claim 36 wherein determining the action to take includes evaluating an IP address reputation.

40. The system of claim 36 wherein determining the action to take includes inspecting a DNS request and providing a reputation score for a domain.

* * * * *